July 18, 1961
J. A. GAYLORD
2,992,849
SAFETY DEVICES FOR RELEASABLE SUSPENSION
LOCK FOR AERIAL SURVIVAL KITS
Filed May 4, 1959
2 Sheets-Sheet 1
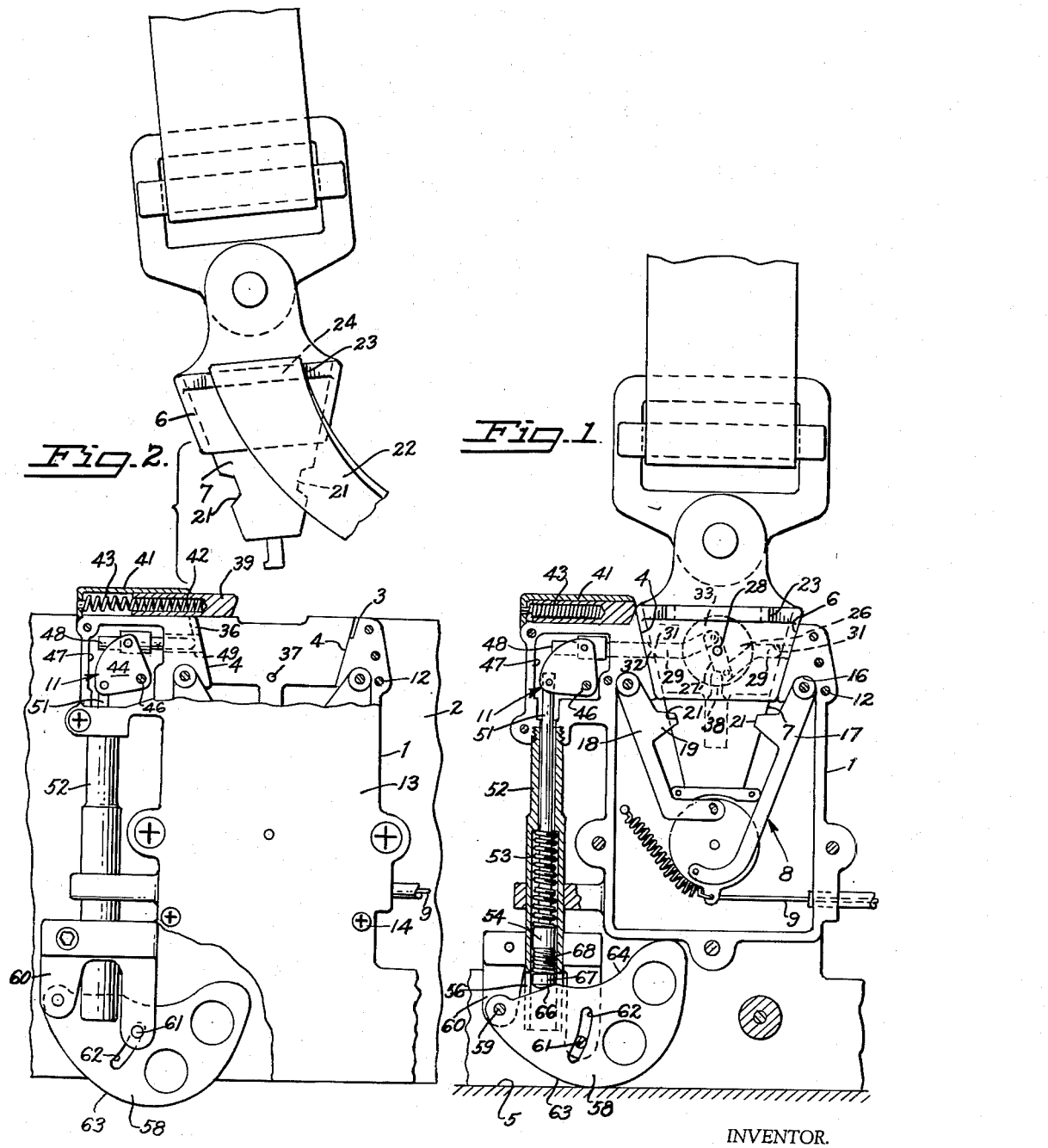
INVENTOR.
JOHN A. GAYLORD
BY George B. White
ATTORNEY.

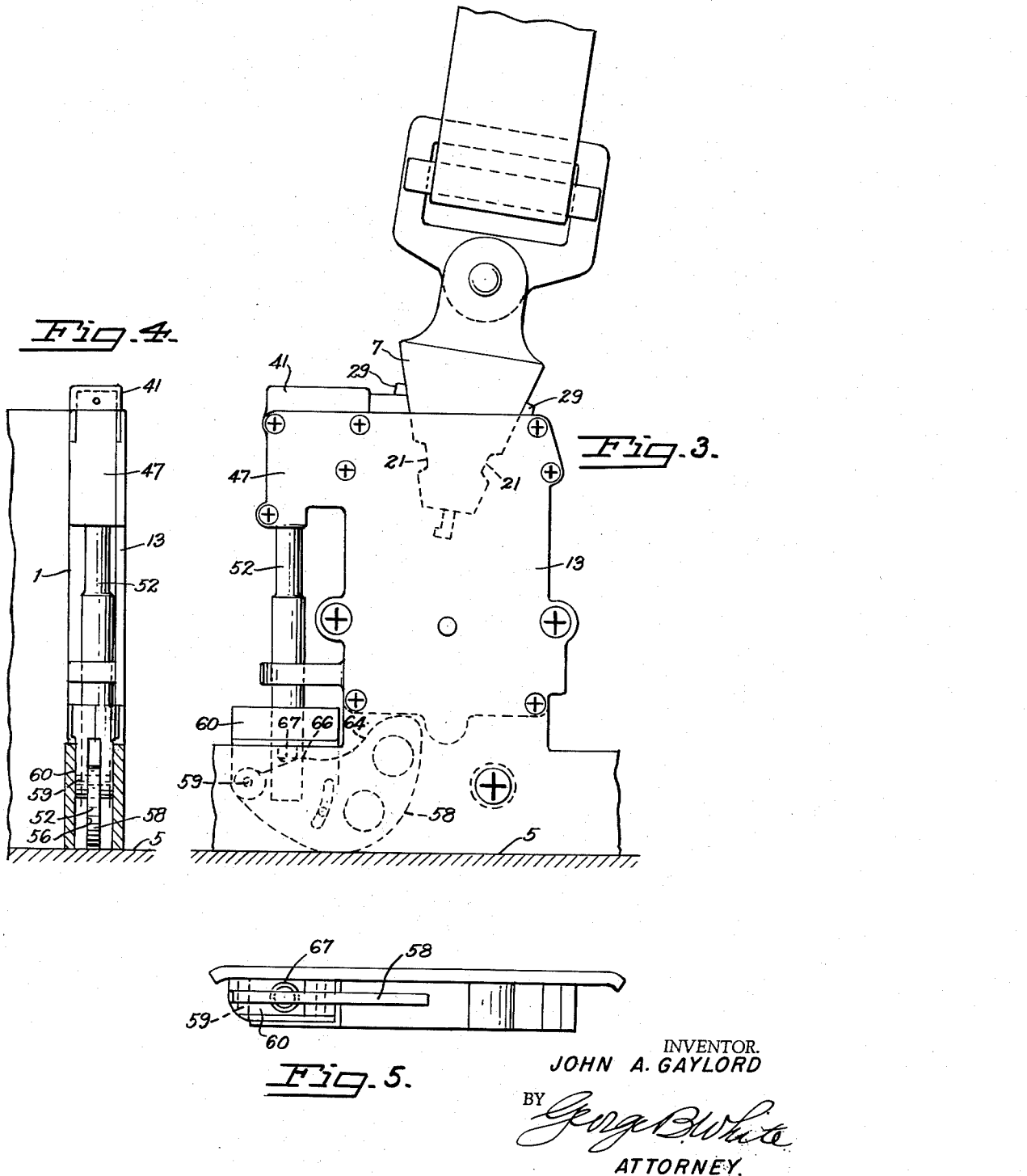

# 2,992,849
SAFETY DEVICES FOR RELEASABLE SUSPENSION LOCK FOR AERIAL SURVIVAL KITS

John A. Gaylord, San Rafael, Calif., assignor to H. Koch & Sons, Corte Madera, Calif., a partnership
Filed May 4, 1959, Ser. No. 810,737
4 Claims. (Cl. 294—83)

This invention relates to safety devices for a releasable suspension lock for aerial survival kits.

Particularly this invention relates to certain safety devices for the type of releasable suspension lock for aerial survival kits described in my co-pending application Serial No. 677,690, filed August 12, 1957.

My said copending application describes and shows a strap connection locking means for the hanging strap whereby the strap is positively locked to the survival kit and cannot be accidentally disengaged by vibration or shock of any degree or of direction until the lock is positively disengaged at will by a releasing mechanism; and in said surviving kit a combination device is provided for connecting a suspension strap to a plug and a suspending lanyard to a sleeve around the plug, which lanyard is adapted to suspend the kit in the air.

The primary object of the present invention is to prevent the insertion and locking of the plug of the suspension strap connection into the locking device unless the sleeve is in its proper position on the plug; this being of importance in order to prevent fatal mistake whereby by reason of the absence of the sleeve, when the kit is released from the seat without connection between the suspension strap and the lanyard the kit would drop off entirely and would be fatally inoperative. It is of vital importance to prevent any accidental connection of the hanging strap to the survival kit connection and locking device unless the lanyard sleeve is also in place.

Another object of the invention is to provide positive operation for the withdrawing device whereby the plug is freed from the sleeve when the kit is resting on a supporting surface such as the seat beneath the aircraft personnel and which prevents the connection of the plug to the sleeve on vibration or minor lifting movement but controls the interlocking of the plug and the sleeve of such devices upon the deliberate and positive removal or separation of the kit from the supporting surface or seat.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a partly sectional view showing the plug and sleeve connections inserted in the locking device of the kit, resting on a seat.

FIG. 2 is a partly sectional view showing the plug and sleeve released together from the locking device after the kit is freed from the seat.

FIG. 3 is a side view showing the obstruction of the attempted insertion of the plug without the sleeve into the locking device.

FIG. 4 is an edge view of the locking device, and

FIG. 5 is a bottom plan view of the locking device.

The general structure of the releasable locking device for such survival kits is described in my said copending application and it includes a housing 1 which is secured to one side of the case 2 of the survival kit, the bottom of which kit rests upon a supporting surface or seat 5. The top 3 of said housing 1 has therein a generally frusto-conical elongated socket 4 into which fits an elongated generally frusto-conical lanyard connecting sleeve 6. Into this frusto-conical lanyard connecting sleeve 6 fits a generally frusto-conical strap connecting plug 7. A device 8 inside of the housing 1 functions to lock the plug 7 normally and to release the plug 7 whenever a line 9 is suitably manipulated. Also on the housing 1 is a suitable sleeve locking mechanism 11 adapted to disengage the lanyard sleeve 6 from the plug 7 whenever the survival kit case 2 is resting on the seat 5 beneath the person and to automatically cause rigid connection between the lanyard sleeve 6 and the plug 7 whenever the survival case 2 is lifted up or freed from the seat 5.

The housing 1 is fastened by suitable screws 12 to the adjacent side of the case 2 and has a cover 13 secured thereover by suitable screws 14, particularly as shown in FIG. 3. Under the top 3 of the housing 1 and at the inner end of the elongated socket 4 are provided journal sockets 16 to accommodate the respective pivoted ends of opposite jaws 17 and 18. Each of jaws 17 and 18 has thereon a finger 19 for engagement with the adjacent notches or recesses 21 on the adjacent inclined edge of the flat plug 7 below the socket 4. The manipulating and connection device to release the jaws is illustrated in the drawings, but no detailed description is required herein because the improvements on this application may be used in connection with any type of such manipulating or operating devices for the release of the jaws and for the ejection of the plug from the socket.

In assembling the device it can happen that the sleeve 6 connecting the kit suspension lanyard 22 is not assembled on the plug 7. If in haste, the person could connect the plug 7 into the socket 4 without the sleeve 6, and if in case of emergency the plug would be thus released, then the kit would fall away from the person altogether and drop independently because it would not be suspended by the lanyard 22 on the hanging strap from the person and thus the kit would be lost and the safety of the person descending from the plane would be endangered.

The lanyard connecting sleeve 6 has near its upper end a side flange 23 with a slot 24 therein for engagement by said lanyard 22. The other end of the lanyard 22 is connected through the top of the survival kit to the housing 1 so that upon the detachment of the plug 7 and the sleeve 6 from the survival kit, the kit housing will hang on the lanyard 22.

The body of the plug 7 has therein a center pocket 26. In the pocket 26 there is a lever 27 pivoted on a pivot pin 28 transverse to the flat plug 7. The lever 27 is generally parallel with the plane of the flat plug 7. A pair of bent bolts 29 are pivoted on the lever 27 respectively above and below the pivot pin 28 and extend through lateral holes 31 in opposite directions through the respective edges of the plug 7. The lanyard connecting sleeve 6 has opposite holes 32 in its narrow ends into which the ends of the respective bolts 29 extend so as to positively lock together the sleeve 6 and the plug 7. A coil spring 33 anchored in the top of the plug 7 at an angle to the lever 27 is also anchored in an extension of the lever 27 above the upper bolt 29 so as to normally pull the lever 27 in a contra clockwise direction viewing FIG. 1, and thereby normally to urge the bolt 29 into the respective keeper holes 32 in the lanyard sleeve 6. The frusto-conical socket 4 has a pair of opposite grooves 36 in its upper portion to accommodate the tips of the bolts 29 projecting through the holes 32, and thus to locate the plug 7.

A locating pin 37 extends transversely from one side of the socket 4 so spaced from the top of the socket 4 that it is engaged by a notch 38 in one of the bottom edges of the sleeve 6 thereby to further aid in the location of the plug 7 in the socket 4.

In order to obstruct the insertion of the plug 7 into the socket 4 unless the sleeve 6 is in position on the same, I provide an obstruction finger 39 which enters the opening of the socket 4 so that when an attempt is made to insert the plug 7 into the socket 4, the adjacent bolt 29 will strike the obstruction finger 39 and prevent the insertion of the plug as shown in FIG. 3. This obstruction finger 39 is slidable in an ear 41 on the top of the housing 1. The obstruction finger 39 has a hole 42 in its inside end and a spring 43 is nested in the hole 42 and bears against the bottom of the hollow ear 41 so as to normally urge the obstruction finger 39 over the area of the socket 4 as shown in the position in FIGS. 2 and 3. The inclined edge of the sleeve when in position, pushes the finger 39 into an out of the way position and the outer end of each bolt 29 is rounded and the top edge of the finger is also rounded so that the slight projection of the bolt from the sleeve will aid in pushing the finger 39 further out of the way without interfering with the insertion of the sleeve 6 on the plug 7 into the socket 4.

The control mechanism for interlocking of the plug 7 and the lanyard 6 includes a crank plate 44 journalled on a pivot 46 in an extension pocket 47 along a side of the housing 1. In the upper corner of the plate 44 is pivoted a plunger 48 which extends through a guide hole 49 in alignment with the adjacent keeper hole 32 in the sleeve 6, and opposite the end of the adjacent bolt 29. From the lower corner of the crank plate 44 extends pivoted rod 51 through a guide 52 which is screwed into the bottom of the pocket 47 generally at right angles to the plunger 48.

The lower portion of the guide 52 is enlarged so as to accommodate a coil spring 53 around the lower portion of the rod 51 and bearing against a head 54 on the lower end of the rod 51. The lower end of the enlarged head 54 of the rod 51 is spaced above the lower end of the guide 52. The lower end of the guide 52 has aligned slots 56 to accommodate therein a pivoted cam 58.

This cam 58 is a flat piece of material one end of which is pivoted on a pivot 59 in a yoke bracket 60 secured to the housing 1 which straddles the cam 58. The legs of the yoke opposite from the pivot 59 has a guide pin 61 extended transversely thereto on which guide pin 61 travels an arcuate slot 62 in the cam 58 centered around the cam pivot 59. The exposed or outer edge 63 of the cam 58 is generally arcuate and it is so formed that when the cam is resting on the surface on which the kit is rested, then it is pushed entirely inwardly so as to be flush with the bottom of the kit. For this purpose the bottom of the housing 1 is also provided with a suitable slot to conceal the cam 58 therein. The top or inner edge 64 of the cam 58 has a cam projection 66 therein which bears against a cushion button 67 for compressing a compression spring 68 against the lower end of the head 54 on the rod 51 within the guide 52.

In operation when the kit is placed upon the seat of the pilot or aircraft personnel, the cam 58 is pushed in the position shown in FIG. 1 holding the rod 51 in upwardly pushed position so as to push the plunger 48 into the hole 32 of the sleeve 6 and thereby to push the bolts 29 out of engagement from the sleeve 6 to permit the withdrawal of the plug 7 from the sleeve 6. In this position the plunger 48 retains the sleeve 6 in the socket 4. The person using the kit thus can disconnect his parachute straps and hangers from the kit at will without pulling the lanyard 22. When a person is ejected or jumps from the plane the kit travels with him and when freed from the seat 5, the cam 58 is pushed by the compression spring 68 away from the bottom of the housing 2 and after the stronger spring 68 is expanded, the weaker tension spring 53 moves the rod 51 to follow the cam 58, thereby to turn the crank plate 44 so as to pull the plunger 48 out of the sleeve hole 32 thereby to permit the bolts 29 to lock the sleeves 6 and the plug 7 together automatically. When at suitable altitude the pilot or aircraft personnel suitably pulls the line 9 and releases the plug 6 for dropping the kit, the sleeve 6 is withdrawn with the plug 7 and thus the kit drops and is suspended on the lanyard 22 and is operated suitably for its purposes. Any accident by reason of omission of the lanyard sleeve 6 from the plug 7 is positively avoided by the safety obstruction device, heretofore described, which prevents the insertion of the plug 7 into the socket 4 of the housing 1 or the locking of the plug 7 in position unless the sleeve 6 is assembled thereon. Therefore the safety of the aircraft personnel and utility of the safety kit is greatly enhanced.

I claim:

1. In a releasable suspending device for survival kits, in combination with a housing secured to the survival kit, a socket in a wall of the housing, a plug insertable into the socket and connectable to a suspending element, a holder sleeve on the plug fitting between the plug and the socket and being connectable to another suspending element, an interlocking member extended from said plug into said sleeve, a resiliently yieldable means in said plug to urge said interlocking member into said sleeve for locking said sleeve and plug together, a plug obstructing member on the housing, means to guide said plug obstructing member transversely to said socket, resiliently yieldable means to urge said plug obstructing member normally to project into the area of said socket so as to obstruct insertion of said plug, said interlocking member projecting outwardly from said plug into abutting position relatively to said plug obstructing member so as to abut said plug obstructing member when the plug is inserted into said socket without said sleeve, the side of said sleeve adjacent said plug obstructing member being a camming surface capable of retracting the plug obstructing member from said socket as said sleeve is inserted, and keeper means in said socket interengageable with said interlocking member for retaining the plug in said socket.

2. In a releasable suspending device for survival kits, the combination defined in claim 1, wherein said plug obstructing member is a finger, said finger being slidable in said guide means towards and away from said socket and into and out of said projecting position, and said resiliently yieldable means for said plug obstructing member being in said guide means so as to urge said finger into projecting position in said socket.

3. In a releasable suspending device for survival kits, the combination as defined in claim 1, wherein said camming surface on said sleeve being inclined toward the opposite side of the sleeve inwardly of the socket so as to exert a wedging action for pushing said obstructing member out of the way of said socket.

4. In a releasable suspending device for survival kits, the combination defined in claim 2, said finger having a tip on the end thereof projecting into said socket, and said camming surface of said sleeve being inclined toward the inner end of said plug and socket for exerting wedging action on said tip of said finger for pushing said finger out of said projecting and obstructing position.

No references cited.